July 4, 1933.  W. A. TRATSCH  1,916,590
AMUSEMENT DEVICE
Filed Sept. 2, 1930  6 Sheets-Sheet 2
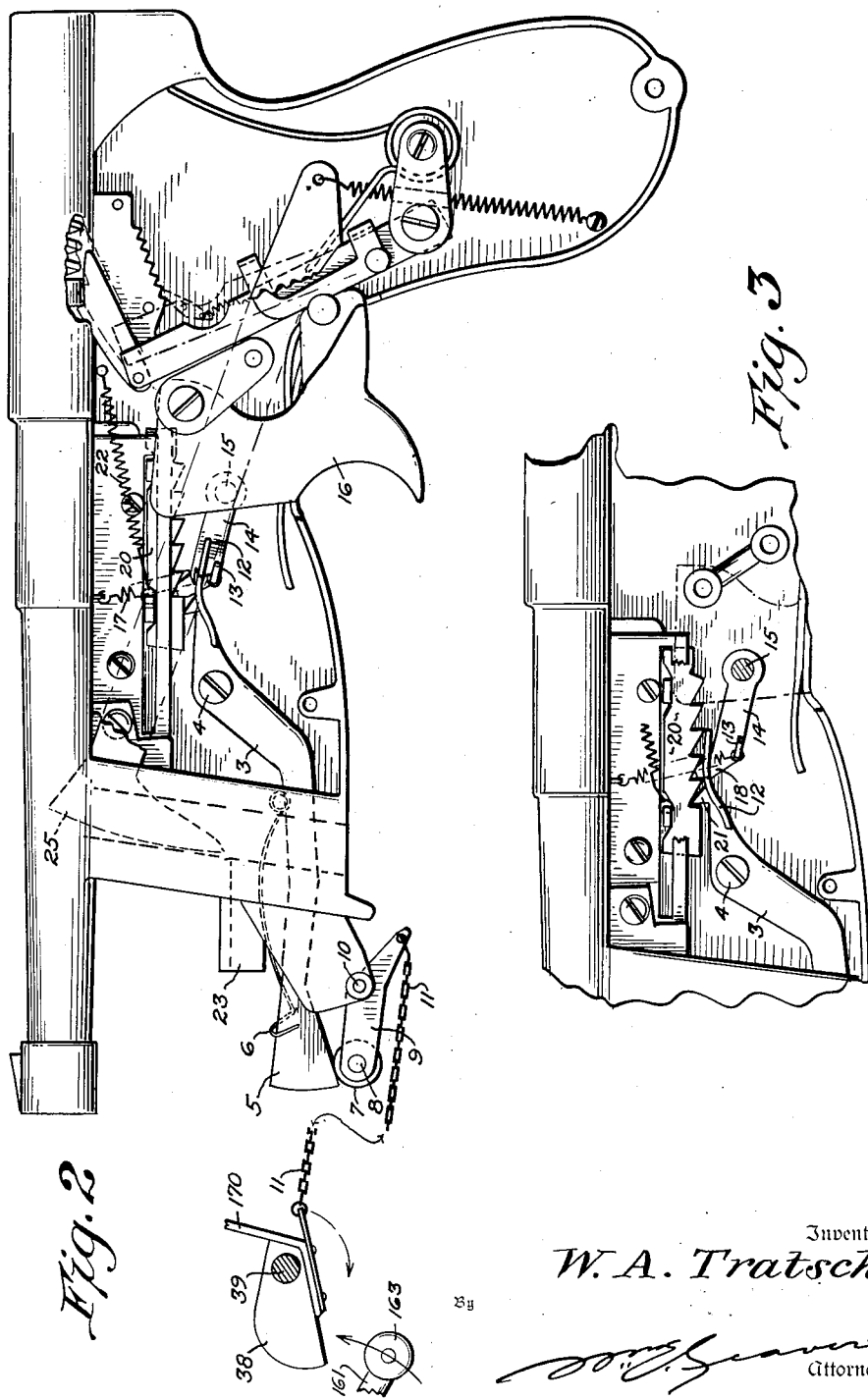
Inventor
W. A. Tratsch
By
Attorney July 4, 1933.  W. A. TRATSCH  1,916,590
AMUSEMENT DEVICE
Filed Sept. 2, 1930   6 Sheets-Sheet 3

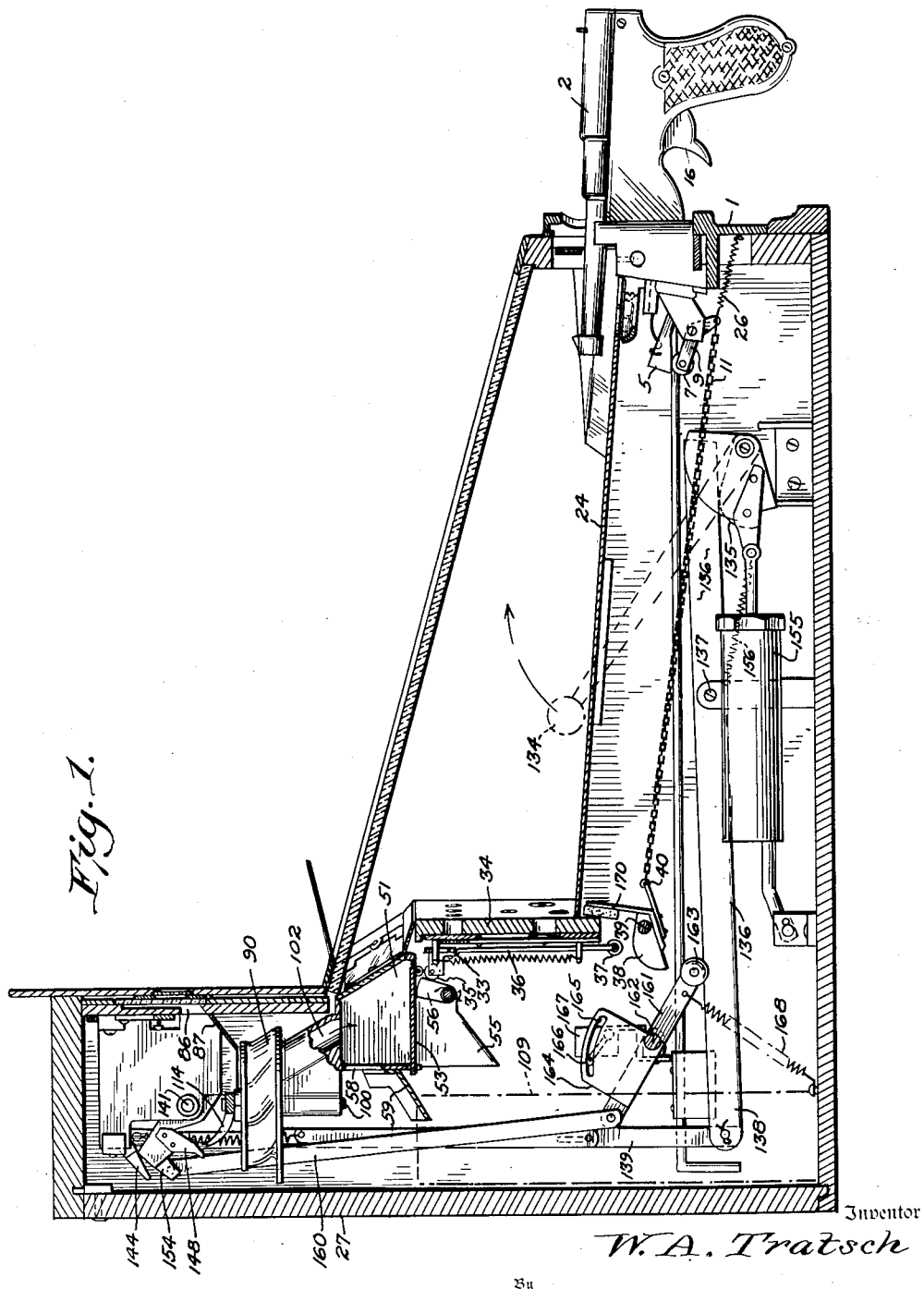

Inventor
W. A. Tratsch
By
Attorney

July 4, 1933.  W. A. TRATSCH  1,916,590
AMUSEMENT DEVICE
Filed Sept. 2, 1930     6 Sheets-Sheet 4
Fig. 5
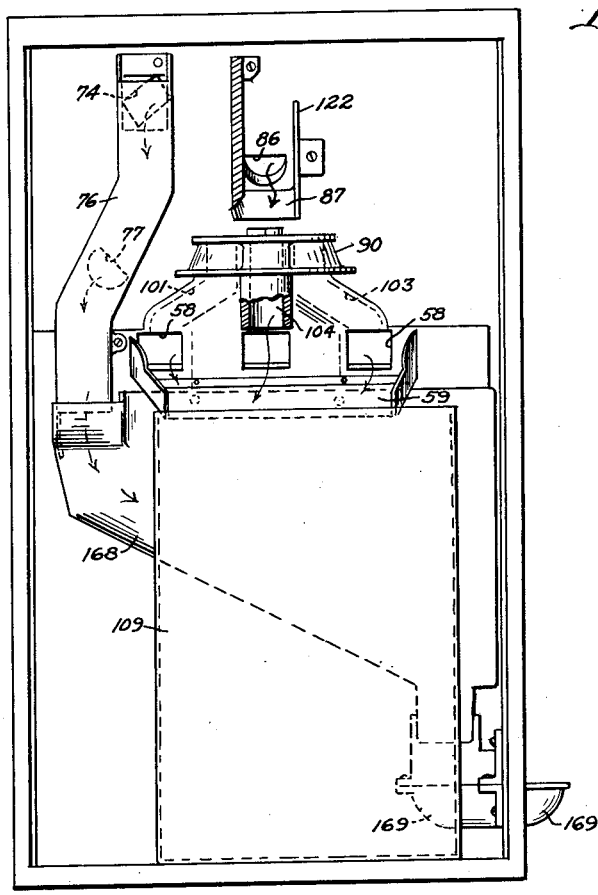
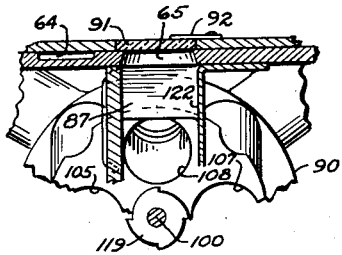
Fig. 6
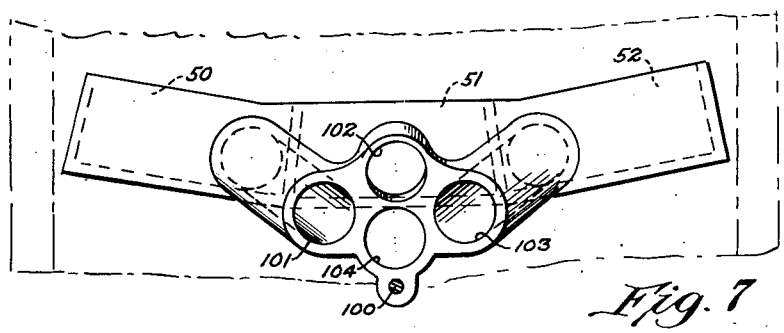
Fig. 7
Inventor
W. A. Tratsch
By
Attorney July 4, 1933. W. A. TRATSCH 1,916,590
AMUSEMENT DEVICE
Filed Sept. 2, 1930 6 Sheets-Sheet 5

Inventor
W. A. Tratsch
By
Attorney

July 4, 1933.　　　W. A. TRATSCH　　　1,916,590
AMUSEMENT DEVICE
Filed Sept. 2, 1930　　　6 Sheets-Sheet 6
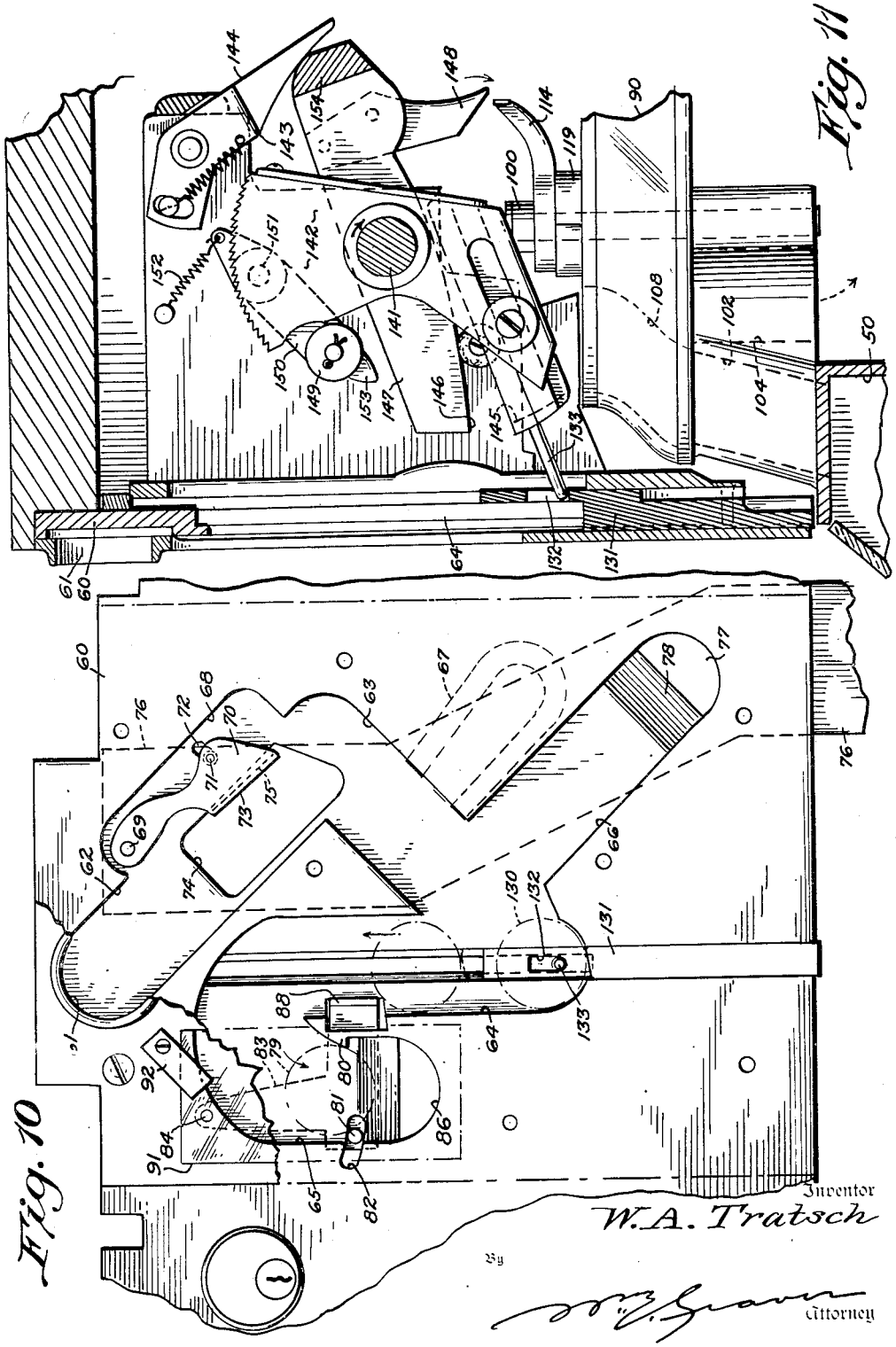

Patented July 4, 1933

1,916,590

UNITED STATES PATENT OFFICE

WALTER A. TRATSCH, OF CHICAGO, ILLINOIS

AMUSEMENT DEVICE

Application filed September 2, 1930. Serial No. 479,315.

This invention relates to an amusement device and has for its object to provide a construction simple in parts, and efficient in operation, and adapted to test the skill of the operator.

With these and other objects in view the invention resides in the novel details of construction and combinations of parts as will be disclosed more fully hereinafter and particularly pointed out in the claims.

Referring to the accompanying drawings forming a part of this specification in which like numerals designate like parts in all the views,—

Fig. 1 is a longitudinal vertical central sectional view taken through the device;

Fig. 2 is a side elevational view of the pistol, used in the operation of this device, a side cover plate being removed to illustrate more clearly the interior mechanism;

Fig. 3 is a detail view of some of the parts shown in Fig. 2 in a different position;

Fig. 5 is a diagrammatic rear elevational view of the device illustrating the arrangement of the receptacles for receiving the tokens used to operate the mechanism;

Fig. 6 is a detail sectional view of the lower portion of a token passage and illustrates the deflection therefrom of a token to the token distributor;

Fig. 7 is a detail top plan view illustrating the casting for directing tokens into different compartments of the device;

Fig. 10 is a front elevational view of the token passage plate; and

Fig. 11 is a vertical sectional view of the control mechanism.

Figure 4:
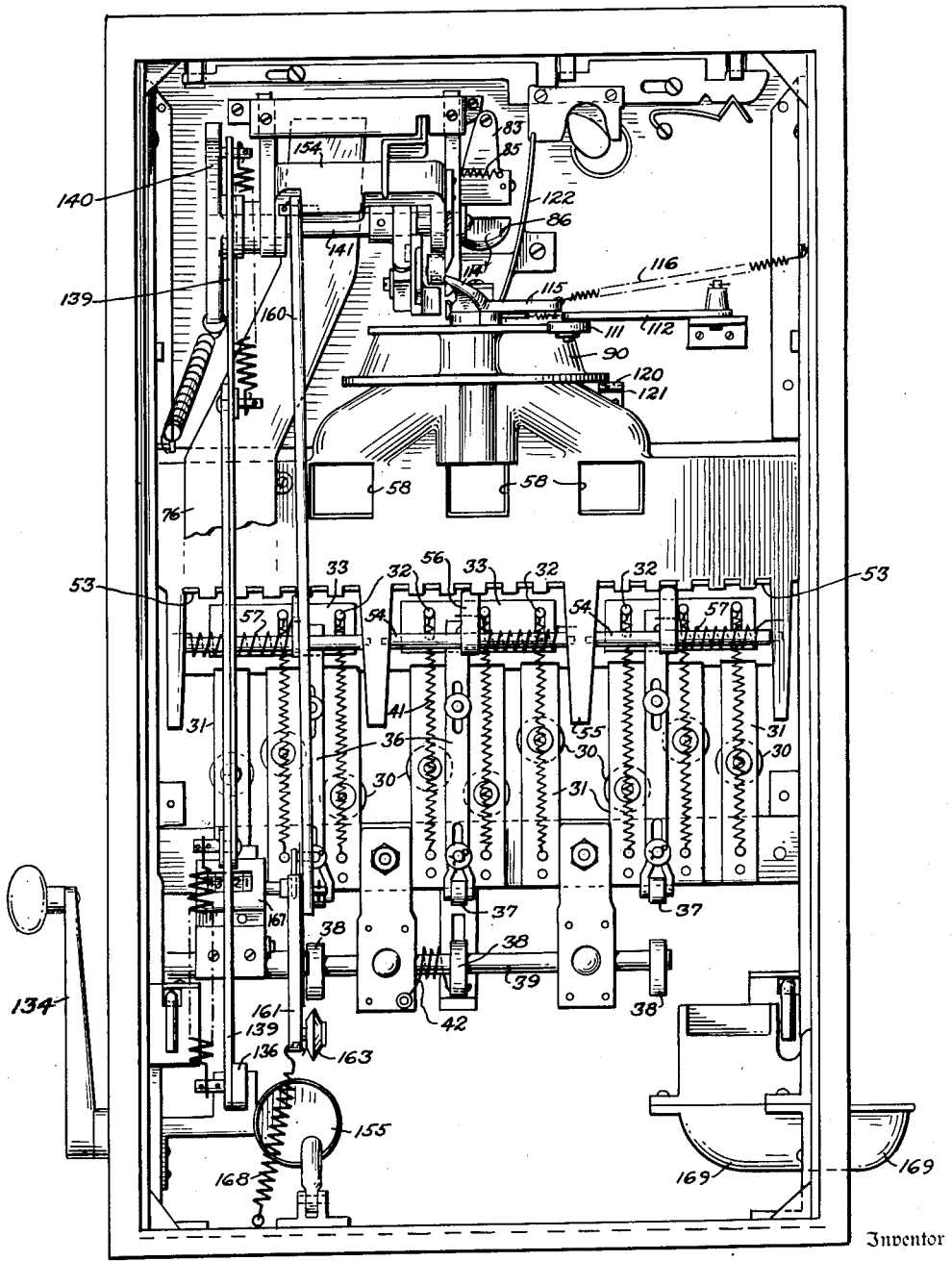
Fig. 4 is a rear elevational view of the mechanism of this device.

This device comprises an improved mechanism by which the skill of the operator may be tested and improved. In other words the device is a miniature pistol range and comprises a plurality of targets, a pistol for firing a predetermined number of balls at the targets, an inclined surface over which the balls are fired and which provides means for returning the fired balls to the pistol, and mechanism for controlling the firing of the pistol. The controlling mechanism comprises a plurality of channels through which a token or disc of predetermined dimensions may slide, a plurality of compartments into which the tokens may be directed, and mechanism controlled by each inserted token for unlocking and locking the pistol. The targets have associated therewith a release mechanism for delivering from the device all of the tokens in a compartment as a reward for a predetermined number of bull's eyes.

The device consists of a suitable cabinet in the front wall of which is universally mounted a pistol generally indicated by the numeral 2 which is substantially of the same construction as the pistol disclosed in the U. S. Letters Patent 1,551,858 granted September 1, 1925 to Walter A. Tratsch. The pistol of said patent is adapted to be unlocked by the insertion of a token or disc of predetermined dimension which, when moved forwardly by a slide, causes a lug 164 carried by said slide to trip a holding lever 160 to release a notched slide 181, which slide is then ready for movement notch by notch in a forward direction by a trigger controlled pawl 168, the number of notches in the slide determining the number of times the trigger can be pulled and the pistol fired. The pistol of this invention does not have said slide but is provided with a lever 3 pivoted as at 4 having an end 5 controlled by a spring 6, said end projecting forwardly out of the pistol. The underside of the end 5 is adapted to coact with a roller 7 mounted as at 8 on one end of a lever 9 pivoted as at 10 to the forward part of the frame of the pistol, the opposite end of the lever 9 having secured thereto one end of a chain 11 the other end of which is connected to the target resetting mechanism to be described later.

The other end of the lever 3 has a finger 12 which, when the lever 3 is oscillated, strikes in its downward movement an extension 13 formed on the end of an arm 14 pivoted as at 15 to the trigger 16, the extension 13 being normally under pressure of the spring 17, as will be clear from Figs. 2 and 3. The arm 14 has a tooth 18 formed at its extremity for engagement with the notches of the slide 20 which is in all respects similar to the slide 121 of the aforementioned patent. The lever 3 adjacent the finger 12 has a detent or holding tooth 21 for holding the slide 20 each time the trigger is pulled, but each time the trigger is released its pawl 18 will cause a forward movement of the slide 20 notch by notch the teeth of the slide depressing and riding over the detent tooth 21, the slide being always under the tension of a spring such as 22.

From the foregoing it will be understood that each time the chain 11 is pulled forwardly with respect to the pistol, the roller 7 will move upwardly the end 5 of the lever 3 causing the other end of said lever to move downwardly whereupon the detent tooth 21 will be disengaged from the slide 20, and at the same time oscillate the arm 14 to cause disengagement of the pawl 18 from the notches of the slide whereupon the slide will snap rearwardly under the urge of its spring 22. A spring 26 disposed between the front wall 1 and the lever 9 maintains the latter normally in position so that the roller 7 carried thereby permits the end 5 of the lever 3 to be depressed under the urge of its spring 6, but when the chain 11 is pulled the tension on the spring 26 is increased while the roller 7 elevates the lever 3, all as will be clearly understood.

The remaining construction of the pistol is substantially the same as that disclosed in the aforementioned patent except for a change in the means for loading balls into the barrel and the means for firing the ball from the barrel. In other words there is a grooved ledge 23 formed integrally with the frame of the pistol and onto which the balls roll from the inclined surface comprising the plate 24 extending between the targets and the pistol, said ledge positioning the balls to be successively received and elevated by a loading lever 25 for ultimate delivery into the barrel. The pistol has a normal inclination downwardly toward the butt so that each ball delivered to the barrel will roll therein to the spring controlled plunger controlled by the trigger 16 for propelling the ball toward the target.

Intermediate the front wall 1 and the rear wall 27 and substantially parallel thereto are disposed the targets which are constructed substantially the same as the targets disclosed in the U. S. Letters Patent 1,656,306 granted January 17th, 1928, to Walter A. Tratsch, in that there is provided a main supporting plate provided with apertures in registry with which are the targets 30 each comprising a metallic disc rigidly mounted intermediate the ends of a leaf spring 31 whose lower end is rigidly secured to the back side of said plate whereby, when the target 30 is struck by a fired ball, the force is great enough to deflect the spring 31 and cause its upper free end to become disengaged from the under edge portion of a slide carrying a pin 32 working in a slot of predetermined length formed in a cross bar 33. This cross bar is made of a width to extend horizontally across a plurality of targets (three as shown in Fig. 4) and is immediately to the rear of the main target supporting plate 34. Each bar has rigidly formed therewith a lateral extension carrying a roller 35 for a purpose to be described later and, depending from this extension is a resetting bar 36 adapted for limited sliding movement, the lower end of bar 36 carrying a roller 37 adapted to be contacted by the curved surface of a cam 38 mounted on a shaft 39 disposed below the target plate.

In Fig. 4 there are shown nine targets arranged in three groups of three targets each, each group having associated therewith a bar 33 and a cam 38. One of the cams 38 is connected as at 40 to the other end of the aforementioned chain 11. It thus results that when the shaft 39 is oscillated, not only will the chain 11 be pulled in a forward direction to unlock the pistol but each of the cams will be actuated to move upwardly each of the cross bars 33 through the medium of the depending bar 36. The shaft 39 is suitably mounted in brackets formed on the target plate.

Each resetting bar 36 is similar to the resetting bar 60 of the Patent 1,656,306 except in the construction of its lower end as has been heretofore described, and each cross bar 33 is similar in substantially every respect to the cross bar 71 of said patent, it being supported by the pins 32 which are similar to the pins 55 of said patent and controlled by springs 41. It therefore will be understood that when less than all of the targets of any one group are struck, the pins 32 associated therewith will move downwardly in the slots provided therefor in the cross bar 33, but said cross bar will be retained in its uppermost position by the pins of those targets which have not been struck. When all of the targets of any one group have been struck then all of the pins 32 in that group will move downwardly under the urge of their springs 41 and the bar 33 will move downwardly carrying the roller 37 of its associated resetting bar into position to be subsequently contacted and raised by its associated cam 38. A spring 42 is provided to keep the cams 38 normally in lowered position relative to the target resetting bars, or in the position shown in Fig. 1.

When each resetting bar 36 is moved upwardly by its cam its associated cross bar 33 will elevate all of the pins 32 associated therewith and the parts are so dimensioned that, when the cam 38 has reached the limit of its upward throw, the slides carrying the pins 32 will have been moved upwardly a distance sufficient to permit each of the target leaf springs 31 to move under the lower edge of said slides and retain them in their elevated position until the targets are next struck. The construction should be clearly understood from the foregoing with particular reference to the said Patent 1,656,306.

Associated with each group of targets is a compartment adapted to receive some of the tokens used to operate this device, there being three of such independent compartments shown in Figure 7 at 50, 51 and 52 and each compartment has a trap door such as 53 see Figure 1 hinged at its forward edge so that when the door is opened the tokens in the associated compartment will be dumped in a direction downwardly and toward the rear of the device. Beneath and parallel to each trap door is a rock shaft indicated at 54 in Figure 4, the ends of said shaft being suitably journaled in depending brackets such as 55 cast with the compartments, and on each rock shaft substantially centrally thereof is rigidly secured a latch member 56 controlled as by a spring 57 whereby the latch member is given a tendency to rotate clockwise as seen in Fig. 1 and release the trap door associated therewith. In other words each latch member is made of a length sufficient, when in its vertical position, to engage the underside of the trap door 53 and hold it closed, but when the latch member is moved by virtue of its spring it will no longer serve as a support and thereupon said door will open under the urge of gravity plus the weight of the tokens resting thereon.

Each latch member 56 is controlled by the roller 35 carried by the bracket extension of each cross bar 33, see Figure 1, and therefore when a cross bar 33 moves downwardly its roller will likewise travel downwardly riding over the forward substantially vertical side of its associated latch member 56 and permit said member to oscillate under the urge of its control spring and release its associated trap door. During the resetting of the targets, the roller 35 will be moved upwardly, engaging said face of said latch member and cause a rotation of the latter against the tension of its spring and ultimately cause said member to close its associated trap door. Each compartment has an opening 58 in the upper portion of its rear wall, and a downwardly inclined chute 59 fastened therebelow (see Figs. 1 and 5) whereby, when any one compartment becomes overloaded with tokens, the surplus tokens may pass through said openings and over said chute to a box provided therefor, thus preventing a jamming not only of each token compartment but of other parts of the mechanism.

With particular reference to Figures 10 and 11 there is shown the passage provided for each token inserted in this device. In other words there is a vertical plate 60, extending above the tops of the compartments just described in which there is formed a groove or channel of a width and thickness to receive the required token from the inlet 61 provided in a cover plate. This passage comprises a channel 62 which extends obliquely downwardly at about an angle of 45° to join the upper end of a second channel 63 extending downwardly and making an angle of substantially 90° with the channel 62. The other end of the channel 63 meets the lower end of a vertical channel 64 the upper end of which is arcuately joined to the top of a short channel 65 substantially parallel to the channel 64. A subsidiary channel 66 extends downwardly at substantially 90° from the channel 63 at a point near the lower end of the latter, and immediately adjacent the channel 66 is provided a magnet 67 for a purpose presently to appear. A pocket 68 is formed along the upper side of the channel 62 and in this pocket is pivoted as at 69 a stop member 70 having a pin 71 engaging a slot 72 for limiting the extent to which the stop 70 may enter the channel 62.

A token of the required size will pass downwardly in the channel 62, engage the cam or inclined edge 73 of the stop 70, raise the same against the urge of gravity, and pass said stop to enter the channel 63. On the other hand a token of a size less than that required will pass downwardly in the channel 62, but will fall therefrom through an opening 74 provided in the rear wall of the plate 60, said fall being augmented by a bevelled surface 75 formed along the edge 73 of the stop 70, such token falling into a chute 76 (see Fig. 5) which will ultimately return the said token to the operator of the device. Should the token inserted be of the required size but made of iron or steel, such as a slug or washer intended to operate this device in a fraudulent manner, it will pass as above stated to and into the channel 63, but its speed will be checked by the magnet 67 with the ultimate result that it will fall into the subsidiary channel 66 the lower end of which has an opening 77 having a bevelled surface 78 associated therewith, said opening communicating with the aforementioned chute 76, as a result of which said iron or steel disc will be returned to the operator. If the token inserted be of predetermined characteristics, such as size and metal, it will successfully jump the end of the channel 66 and come to rest in the lower end of the vertical channel 64. Some of these discs or tokens are made solid while others are provided with a central aperture thus forming a ring, and therefore this device is provided with mechanism for handling both types of tokens.

Whether a solid or an open token is used, it will be moved upwardly in the channel 64 and over into the channel 65 coming to rest in the position indicated in dotted lines at 79 in Figure 10, resting against a point 80 on one side of the channel and against a pin 81 on the other side, the pin 81 being operable in a slot 82 in the plate 60 and carried by a trip device 83 pivoted as at 84 on the back side of said plate. A spring 85 (see Fig. 4) normally holds the pin 81 in the path of the token descending in the channel 65 but when the trip member 83 is oscillated its pin 81 will move out of the channel 65 and thus permit the token to fall from its position at 79 to the bottom of the channel 65 where there is an opening 86 disposed substantially centrally of the device, said opening having a downwardly extending shelf 87 therebelow to direct the token to the distributor generally indicated by the numeral 90, see Figures 1 and 5.

The trip device 83 has a projection 88 extending through an opening into the channel 64, which when moved by the next subsequently inserted token rising in said channel, causes the trip device to oscillate and so release the token held by the pin 81 at location 79.

The stop 70 has at its lower extremity a point or corner which prevents any retro-movement of a token from the channel 63 into the channel 62, and the point 80 associated with the channel 65 serves a similar purpose. A glass window 91 secured as by a clip 92 is provided on the front side of the plate 60 by means of which the condition of channel 65 may be viewed without undoing or dismantling the device. The description of the token passage should be readily understood from the foregoing and in this connection it might be stated that it operates in a manner similar to that shown and described in the U. S. Letters Patent No. 1,766,152 granted June 24, 1930 to Walter A. Tratsch.

Substantially centrally of the device and to the rear of plate 60 is a circular casting constituting a token distributor generally indicated by the numeral 90 and which is centrally mounted on a pivot pin 100 carried by an upper extension of the casting forming the compartments 50, 51 and 52. That is to say, the walls of the compartments have upward extensions rigidly formed therewith and which are bored as clearly indicated in Figures 5 and 7 to provide the cylindrical passages 101, 102 and 103 communicating respectively at their lower ends with the compartments 50, 51 and 52. The upper ends of these passages lie in a horizontal plane immediately below the token distributor. A fourth passage 104 is also provided in the compartment casting, the ends of which passage lie in the horizontal planes of the ends of the previously mentioned passages. The passages 101 and 103 are oppositely and angularly disposed to extend from the lower side of the distributor to the tops of the compartments 50 and 52, whereas the passages 102 and 104 are substantially vertically disposed in the central longitudinal plane of the device.

Figures 8, 9:
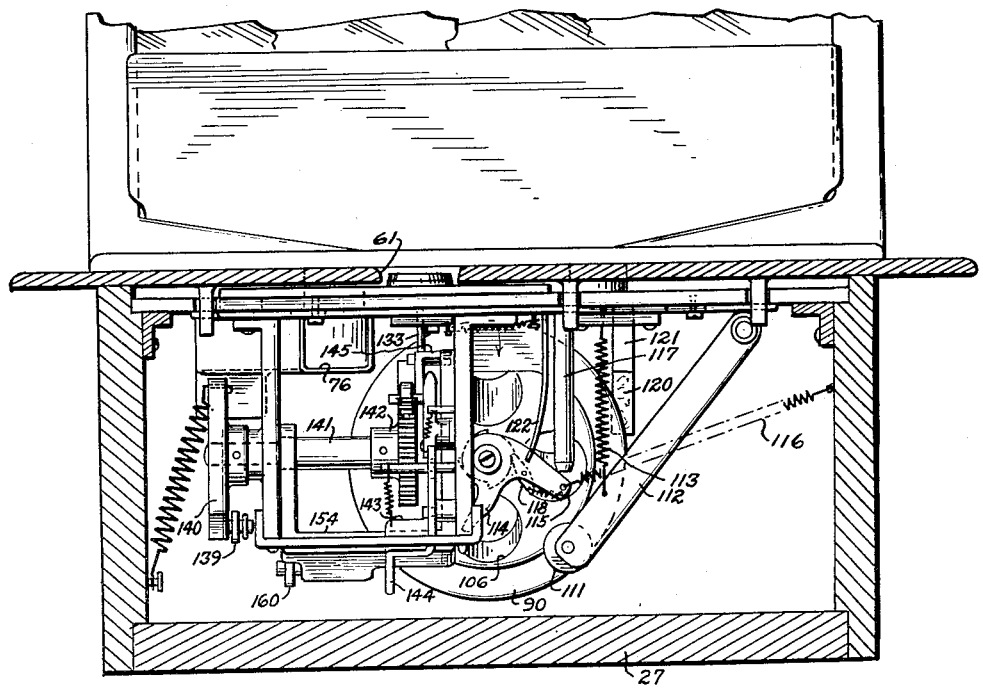
Fig. 8 is a top plan view of the control apparatus used in connection with this device.
Fig. 9 is a horizontal plan view of the distributor and the casting shown in Fig. 7.

The distributor 90 is best illustrated in Fig. 9 from which it will be observed that there are provided therein four cylindrical passages 105, 106, 107 and 108, the axes of which are differently pitched. That is to say, from said figure it will be readily seen that the passage 108 is shown in one of the positions that the distributor automatically assumes during the operation of the device, and said passage is in complete registry with the passage 102 leading to the compartment 51 and therefore a token released by the pin 81 of the trip 83 (see Fig. 10) will drop through the passages 108 and 102 into the compartment 51. The distributor is adapted to be intermittently rotated in the direction of the arrow through 90° immediately prior to the release of each token by the said pin 81 and therefore, just before the next token is to be released, the distributor will have been rotated to bring the passage 107 into the relative position occupied by passage 108 as seen in said Figure 9. The axis of passage 107, however, is so inclined that when said passage reaches this position it will be in registry with the passage 101 leading to the compartment 50 and therefore the token dropped therethrough will fall into said compartment. In a similar manner the passage 106 of the distributor next comes into the relative position occupied by the passage 108 in Figure 9, and when this occurs it will be observed that the axis of the passage 106 is so inclined that said passage will be in registry with the passage 104, and the token dropping through said passage will enter no compartment but will be dropped onto the chute 59 and slide therefrom into a box 109, see Figures 1 and 5. Lastly, when the passage 105 of the distributor has reached the relative position occupied by the passage 108 in Figure 9 it will be observed that the axis of said passage 105 is such that said passage is brought into registry with the passage 103 whereby a token dropped through said passages 105 and 103 will fall into the compartment 52.

Thus it will be seen that the distributor is provided with four passages of different axial disposition whereby, during each complete revolution of the distributor, four tokens will be intermittently and consecutively dropped into four different receptacles. Registry of each passage of the distributor with the passages leading to the receptacles 50, 51, 52 and 109 is assured by the provision of four notches such as 110 spaced 90° apart in the upper edge of the distributor, which notches are consecutively engaged by a roller 111 carried at the end of a pivoted arm 112 controlled by the spring 113, see Figure 8, said notches being so disposed that when the roller 111 is engaged in a notch, one of the passages of the distributor will be in registry with one of the passages 101, 102, 103 and 104.

Loosely mounted on the distributor pin 100 is a cam 114 having a tail 115 to the end of which is secured a spring 116 normally causing said tail to abut a fixed post or stop 117. To the underside of said tail is pivoted a spring controlled pawl 118 adapted to engage one of the four teeth of a ratchet 119 rigidly formed on the top of the distributor, and the parts are so dimensioned and positioned that when the cam 114 is engaged and moved through its complete intended movement the pawl 118 carried thereby will be brought into position to engage the next tooth of the ratchet 119, and when this movement is completed the spring 116 will exert a pull through the tail of the cam to cause a 90° revolution of the distributor, the friction between the holding roller 111 and the notch of the distributor which it occupies being sufficient to prevent a rotation of the distributor in the direction opposite to that shown by the arrow in Figure 9. If found necessary a brake 120 comprising a piece of fiber secured at the end of a leaf spring 121 may be employed to engage the under surface of the distributor to assist in holding the same against retrograde movement. 122 is merely a shield to assist in the direction of a token from the opening 86 to the distributor.

The control mechanism for this entire device is particularly illustrated in Figures 1 and 11 and is very similar to the mechanism disclosed in the aforementioned Patent 1,766,152. That is to say, when a solid disc or token is inserted at 61 and ultimately reaches the position indicated in dotted lines at 130 in Figure 10 it will be supported by a slide or elevator 131 vertically reciprocable in a groove provided therefor in the plate 60, the rear portion of said slide having an opening 132 therein into which projects at all times a lifting finger 133 which corresponds to the lifting finger 31 of said patent. This finger is mounted and operates in substantially the same manner as the finger of said patent. The opening 132 in the slide 131 is so positioned as to substantially coincide with the central area of the token which it supports. When the inserted token has come to rest in the position indicated at 130 a handle 134 (see Fig. 1) is moved in the direction indicated by the arrow, said handle being exterior of the casing of this device but having a shaft extending interiorly thereof on the inner end of which is mounted a cam 135 adapted to lift the forward end of a lever 136 pivoted as at 137 thereby depressing the other end 138 which is pinned to a vertical rod 139 formed in two yieldable parts, the upper end of said rod pivotally connected to a crank 140 rigidly mounted on a shaft 141 to impart clockwise oscillation of said shaft as seen in Figure 11 when the rod 139 is moved downwardly. Said shaft 141 has rigidly mounted thereon a member 142 the upper edge portion of which is arcuately serrated for engagement with an edge 143 on a pivoted spring controlled trip 144, said serrations and edge constituting a full stroke compelling mechanism as will be understood. The lower end of the member 142 slidingly carries the aforementioned finger 133.

From the foregoing it will therefore be understood that when the shaft 141 is rotated in the direction of the arrow the finger 133 will be moved upwardly through an arc and, with a solid token carried by the slide 131, said finger will be prevented from passing all the way through the opening 132 in the slide. In other words as the finger moves upwardly the end thereof will contact one face of the solid token and this contact will be maintained while the finger is moving the slide upwardly. It therefore results that the finger must be moved rearwardly on its sliding support while the token is being conveyed upwardly and this results in bringing a shoulder 145, associated with the finger, under the end 146 of a lever 147 freely mounted on the shaft 141, the continued upward movement of the finger resulting in an oscillation of said lever. The other end of the lever carries a downwardly extending member 148 adapted to engage the surface of the cam 114 associated with the distributor 90 and in the continued oscillation of said lever the member 148 causes a movement of said cam to bring the pawl associated therewith into engagement with the next tooth of the distributor rachet 119.

As the lever 147 is thus oscillated its upper surface contacts with a roller 149 mounted on a trip 150 pivoted as at 151 and controlled by a spring 152, the trip member 150 being so dimensioned that its end 153 will ultimately move forward, engage the back side of the shoulder 145 associated with the lifting finger 133 and shove said shoulder in a forward direction out from under the end 146 of the lever 147, thereby releasing said lever and causing it to move reversely, through the action of the spring 152 and roller 149, whereupon the bar 154 carried by said lever will move upwardly striking the end of the trip 144 and releasing the full stroke compelling engagement between it and the member 142 which latter is thereupon freed to be returned to its normal position when the handle 134 is released. A dash pot 155 and heavy duty spring 156 assist in the easy return of the handle 134 and the parts controlled thereby should the operator have a tendency to let the handle fly.

On the other hand, should a token with an open center be inserted in the device it will come to rest in the position indicated at 130 in Figure 10 but, when the handle 134 is pulled and the member 142 oscillated as hereinbefore explained, the lifting finger 133 will extend all the way through the slide opening 132 and project into the opening of the token. In other words the shoulder 145, associated with the lifting finger, in its upward arcuate travel will not engage with the underside of the end of the lever 147 but will move past the same and therefore not oscillate said lever, as a result of which the distributor 90 will not be rotated and the receptacle with which said distributor is in registry will receive another token, and this said receptacle will continue receiving tokens as long as hollow centered tokens are placed in the machine. In other words the distributor will only be rotated when a solid token is inserted in the device.

The bar 154 has pivotally connected thereto a depending rod 160 the lower end of which is pivoted to one end of a lever 161 pivoted as at 162, the other end of which carries a roller 163 adapted to reset the targets. In other words the roller 163, as clearly seen from Figs. 1 and 4, is disposed in the same vertical plane with one of the cams 38 associated with the targets, and when a solid token is inserted in the device the lever 147 will be oscillated as hereinbefore described, moving with it the bar 154 and causing a downward movement of the rod 160 which in turn moves the said roller 163 upwardly into contact with the underside of the said cam 38. The continued upward movement of said roller oscillates said cam and its shaft whereupon all of the cams 38 are simultaneously actuated to move upwardly and reset the targets. The targets are not reset when an open token is inserted by the operator in the coin chute. The lever 161 has mounted thereon a plate 164 provided with a cam slot 165 in which operates a pin 166 connected to any suitable metering device 167 as a result of which an accurate count is obtained of solid tokens inserted in the device. A spring 168 is secured to the lever 161 to not only normally return the roller 163 after the targets are reset, but to cause an upward movement of the rod 160 and the bar 154 to which it is connected to release the trip 144 and disengage the member 148 from the cam 114 to permit the distributor 90 to make its next rotation.

As hereinbefore stated tokens of lesser size than those intended to be used with this device as well as steel and iron slugs are discharged into the chute 76, see Fig. 5, which chute empties into a larger chute 168 having an inclined bottom and emptying into a pocket or cup 169 extending exteriorly of the casing and from which the operator of the device may recover the same. The compartments 50, 51 and 52 through their trap doors discharge their contained tokens into the chute 168 and these, likewise, may be recovered by the operator from the cup 169. However, the overflow tokens from said compartments escaping therefrom through the openings 58, as well as the tokens passing through the passage 104 of the compartment casting, all fall upon the chute 59 which empties into the box 109 which latter does not communicate with the aforementioned cup 169, as a result of which these tokens are always retained by the device and are collected ultimately by the person owning the device. Access to the box 109 is had by removing the rear wall 27 of the casing which is secured in place by a suitable lock. 170 is an extension of one of the target resetting cams 38 and serves as a stop to limit the downward movement of the cams, said extension preferably having a soft fiber face engaging the lower portion of the target plate to act as a silencer.

It is obvious that those skilled in the art may vary the details of construction, as well as arrangement of parts without departing from the spirit of the invention and it is therefore desired not to be limited to the foregoing except as may be demanded by the claims.

What is claimed is:

1. In an amusement device provided with a plurality of targets and a pistol for firing projectiles at said targets the combination of token receiving means; means to effect the distribution of the tokens received, said means including a plurality of receptacles for the tokens and a member cooperating with the token receiving means; and target controlled means for releasing the tokens in said receptacles.

2. In an amusement device provided with a plurality of targets and a pistol for firing projectiles at said targets the combination of token receiving means; means to effect the distribution of the tokens received, said means including a plurality of receptacles for the tokens, a rotatable member adapted to register with said receptacles, and means cooperating with the token receiving means for moving said member; and target controlled means for releasing the tokens in said receptacles.

3. In an amusement device provided with a plurality of targets and a pistol for firing projectiles at said targets the combination of token receiving means; distributing means for the tokens received including a plurality of receptacles, a member having a plurality of passages adapted to register one at a time with passages leading to said receptacles, and means cooperating with the token receiving means for moving said member; and target controlled means for releasing the tokens in said receptacles.

4. In an amusement device provided with a plurality of targets and a pistol for firing projectiles at said targets the combination of token receiving means; distributing means for the tokens received including a plurality of receptacles with passages leading thereto, a rotatable member having a plurality of passages therein adapted to consecutively register with the receptacle passages for conveying tokens from the receiving means to the receptacles, and means cooperating with the token receiving means for moving said member; and target controlled means for releasing the tokens in said receptacles.

5. In an amusement device provided with a plurality of targets and a pistol for firing projectiles at said targets the combination of token receiving means; distributing means for the tokens received including a plurality of receptacles, a rotatable member having therein a passage adapted to communicate with each receptacle, and means to hold said member to insure said communication; means engageable with the token receiving means to move said member; and target controlled means for releasing the tokens in said receptacles.

6. In an amusement device provided with a plurality of targets and a pistol for firing projectiles at said targets the combination of token receiving means; distributing means for the tokens received including a plurality of receptacles; means governed by the receiving means for affecting the distribution of the tokens; and target controlled means for releasing the tokens in said receptacles.

7. In an amusement device provided with a plurality of targets and a pistol for firing projectiles at said targets the combination of token receiving means; distributing means for the tokens received including a plurality of receptacles; means comprising a cam operated pawl and ratchet governed by the receiving means for affecting the distribution of the tokens; and target controlled means for releasing the tokens in said receptacles.

8. In an amusement device provided with a plurality of targets and a pistol for firing projectiles at said targets the combination of token receiving means; distributing means for the tokens received including a plurality of receptacles; means loosely mounted on the distributing means and engageable by a member governed by the receiving means for affecting the distribution of the tokens; and target controlled means for releasing the tokens in said receptacles.

9. In an amusement device provided with a plurality of targets and a pistol for firing projectiles at said targets the combination of token receiving means; distributing means for the tokens received including a plurality of receptacles; means comprising a cam provided with a pawl said cam loosely mounted for operating a ratchet carried by the distributing means and said cam actuated by a member governed by the receiving means for affecting the distribution of the tokens; and target controlled means for releasing the tokens in said receptacles.

10. In an amusement device provided with a plurality of targets and a pistol for firing projectiles at said targets the combination of token receiving means; distributing means for the tokens received including a plurality of receptacles; means comprising a cam provided with a pawl, said cam loosely mounted on the axis of said distributing means for operating a ratchet carried by the distributing means and said cam actuated by a member governed by the receiving means for affecting the distribution of the tokens; and target controlled means for releasing the tokens in said receptacles.

11. In an amusement device provided with a plurality of targets and a pistol for firing projectiles at said targets the combination of token receiving means; distributing means for the tokens received including a plurality of receptacles; means connected with the receiving means for resetting the targets; and target controlled means for releasing the tokens in said receptacles.

12. In an amusement device provided with a plurality of targets and a pistol for firing projectiles at said targets the combination of token receiving means; distributing means for the tokens received including a plurality of receptacles; means automatically selectively connected with the receiving means for resetting the targets and target controlled means for releasing the tokens in said receptacles.

13. In an amusement device provided with a plurality of targets and a pistol for firing projectiles at said targets the combination of token receiving means; distributing means for the tokens received including a plurality of receptacles; means connected through a slidable member with the receiving means for resetting the targets; and target controlled means for releasing the tokens in said receptacles.

14. In an amusement device provided with a plurality of targets and a pistol for firing projectiles at said targets the combination of token receiving means; distributing means for the tokens received including a plurality of receptacles; means comprising a roller engageable with a cam, said roller carried by a lever linked to a second lever, the latter connected selectively through a reciprocable member with the receiving means for resetting the targets; and target controlled means for releasing the tokens in said receptacles.

15. In an amusement device provided with a plurality of targets and a pistol for firing projectiles at said targets the combination of token receiving means; distributing means for the tokens received including a plurality of receptacles; means connected with the receiving means for resetting the targets and conditioning the pistol for firing a predetermined number of projectiles for each inserted token; and target controlled means for releasing the tokens in said receptacles.

16. In an amusement device provided with a plurality of targets and a pistol for firing projectiles at said targets the combination of token receiving means; distributing means for the tokens received including a plurality of receptacles; means governed by the receiving means for resetting the targets and conditioning the pistol for firing a predetermined number of projectiles for each inserted token, said means including a selectively reciprocable member; and target controlled means for releasing the tokens in said receptacles.

17. In an amusement device provided with a plurality of targets and a pistol for firing projectiles at said targets the combination of token receiving means; distributing means for the tokens received including a plurality of receptacles; means connected with the receiving means for resetting the targets and conditioning the pistol for firing a predetermined number of projectiles for each inserted token of predetermined characteristics, but disconnected with said receiving means when tokens of other than predetermined characteristics are received; and target controlled means for releasing the tokens in said receptacles.

18. In an amusement device provided with projectile engaging portions the combination of token receiving means; distributing means for the tokens received including a plurality of receptacles; means governed by the receiving means for affecting the distribution of the tokens and means for releasing the tokens in said receptacles, said means controlled by projectiles engaging certain of said portions.

19. In an amusement device provided with projectile engaging portions the combination of token receiving means; distributing means for the tokens received including a plurality of receptacles, a token elevator, and a rotatable member intermediate said elevator and a receptacle; and means for releasing the tokens in said receptacles, said means controlled by projectiles engaging certain of said portions.

20. In an amusement device provided with projectile engaging portions the combination of token receiving means; distributing means for the tokens received including a plurality of receptacles, a rotatable member having a token passage adapted to register with a receptacle, and a slide adapted to pass a token from the receiving means to the rotatable member; and means for releasing the tokens in said receptacles, said means controlled by projectiles engaging certain of said portions.

21. In an amusement device provided with projectile engaging portions the combination of token receiving means; distributing means for the tokens received including a plurality of receptacles, a token elevator, and a rotatable member intermediate said elevator and a receptacle; said member having a passage therethrough for conveying a received token to said receptacle; and means for releasing the tokens in said receptacles, said means controlled by projectiles engaging certain of said portions.

22. In an amusement device provided with projectile engaging portions the combination of token receiving means; distributing means for the tokens received including a plurality of receptacles; a token elevator, and a rotatable member intermediate said elevator and said receptacles, said member having a passage therethrough for each receptacle; and means for releasing the tokens in said receptacles, said means controlled by projectiles engaging certain of said portions.

23. In an amusement device provided with projectile engaging portions the combination of token receiving means; distributing means for the tokens received including a plurality of receptacles, a token elevator, and a rotatable member intermediate said elevator and said receptacles, said member having a passage therethrough for each receptacle, said passages arranged for registry one at a time with said receptacles; and means for releasing the tokens in said receptacles, said means controlled by projectiles engaging certain of said portions.

24. In an amusement device provided with projectile engaging portions the combination of token receiving means; distributing means for the tokens received including a plurality of receptacles, a token elevator, and a rotatable member intermediate said elevator and said receptacles, said member having a plurality of passages therethrough of differing axes, a passage for each receptacle; and means for releasing the tokens in said receptacles, said means controlled by projectiles engaging certain of said portions.

25. In an amusement device provided with projectile engaging portions the combination of token receiving means; distributing means for the tokens received including a plurality of receptacles, a token elevator, and a rotatable member intermediate said elevator and said receptacles, said member having a plurality of passages therethrough one for each receptacle, said passages adapted for consecutive registration with said receptacles, said passages so arranged that when one is in registry with a receptacle the other passages will be in non-registry with the other receptacles; and means for releasing the tokens in said receptacles, said means controlled by projectiles engaging certain of said portions.

26. In an amusement device provided with a token receiving slot, the combination of means to move a token in said slot; a plurality of receptacles for the tokens received; a distributor for directing the tokens from said slot to said receptacles; and means cooperating with said first named means for changing the order of direction of the tokens to said receptacles in accordance with the character of token received.

27. In an amusement device provided with a token receiving slot, the combination of means to move a token in said slot; a plurality of receptacles for the tokens received; a distributor for directing the tokens from said slot to said receptacles; and means cooperating with said first named means for moving said distributor to change the order of direction of the tokens to said receptacles.

28. In an amusement device provided with a token chute the combination of a plurality of receptacles for the tokens received; a movable distributor for variably directing the tokens from said chute to said receptacles; and pivoted means for controlling the position of said distributor in accordance with the character of token received.

29. In an amusement device provided with a token receiving slot, the combination of means to move a token in said slot; a plurality of receptacles for the tokens received; a movable distributor for variably directing the tokens from said slot to said receptacles; and means cooperating with said first named means for moving a token through said slot, said means serving to move said distributor only when tokens of a certain characteristic are being moved in said chute.

30. In an amusement device provided with projectile engaging portions the combination of token receiving means including a token receiving slot and a plurality of receptacles in token conducting association therewith; and means for releasing the tokens in a receptacle, said means controlled by projectiles engaging certain of said portions.

31. In an amusement device provided with projectile engaging portions the combination of token receiving means including a token receiving slot and a plurality of receptacles in token conducting association therewith; and slidable means for releasing the tokens in a receptacle, said means controlled by projectiles engaging certain of said portions.

32. In an amusement device provided with projectile engaging portions the combination of token receiving means including a token receiving slot and a plurality of receptacles in token conducting association therewith; and slidable and rotatable means for releasing the tokens in a receptacle, said means controlled by projectiles engaging certain of said portions.

33. In an amusement device provided with projectile engaging portions the combination of token receiving means including a token receiving slot and a plurality of receptacles in token conducting association therewith; and slidable spring tensioned means for releasing the tokens in a receptacle, said means controlled by projectiles engaging certain of said portions.

34. In an amusement device provided with projectile engaging portions the combination of token receiving means including a token receiving slot and a plurality of receptacles in token conducting association therewith; and spring tensioned means for releasing the tokens in a receptacle, said means controlled by projectiles engaging certain of said portions.

35. In an amusement device provided with projectile engaging portions the combination of token receiving means including a plurality of receptacles; and means including a latch and a roller for actuating the latch, said means for releasing the tokens in a receptacle, said means controlled by projectiles engaging certain of said portions.

36. In an amusement device provided with projectile engaging portions the combination of token receiving means including a plurality of receptacles; and means for releasing the tokens in a receptacle, said means including a hinged door to said receptacle, a spring tensioned latch engaging said door, and a slidable member for operating said latch, said slidable member controlled by projectiles engaging certain of said portions.

37. In an amusement device provided with projectile engaging portions the combination of token receiving means including a plurality of receptacles; and means for releasing the tokens in a receptacle, said means including a rotatable member engaged by a roller on a slidable member, the latter controlled by projectiles engaging certain of said portions.

38. In an amusement device provided with projectile engaging portions the combination of token receiving means including a plurality of receptacles; means operable in one direction for releasing the tokens in a receptacle, said means controlled by projectiles engaging certain of said portions; and means for moving the token releasing means in the opposite direction for conditioning said receptacle to receive additional tokens.

39. In an amusement device provided with projectile engaging portions the combination of token receiving means including a plurality of receptacles; means operable in one direction for releasing the tokens in a receptacle, said means controlled by projectiles engaging certain of said portions; and cam means for moving the token releasing means in the opposite direction for conditioning said receptacle to receive additional tokens.

40. In an amusement device provided with projectile engaging portions the combination of means for receiving tokens of differing characteristics, said means including a plurality of receptacles; means operable in one direction for releasing the tokens in a receptacle, said means controlled by projectiles engaging certain of said portions; and means controlled by tokens of a certain characteristic for moving the token releasing means in the opposite direction for conditioning said receptacle to receive additional tokens.

41. In an amusement device provided with projectile engaging portions the combination of token receiving means including a plurality of receptacles; means operable in one direction for releasing the tokens in a receptacle, said means controlled by projectiles engaging certain of said portions; and means including a lever actuated cam for moving the token releasing means in the opposite direction for conditioning said receptacle to receive additional tokens.

42. In an amusement device provided with projectile engaging portions the combination of token receiving means; distributing means for the tokens received including a plurality of receptacles; means governed by the receiving means for affecting the distribution of the tokens; and means for releasing the tokens in said receptacles, said means controlled by projectiles engaging certain of said portions.

43. In an amusement device provided with projectile engaging portions the combination of token receiving means; distributing means for the tokens received including a plurality of receptacles; means comprising a cam operated pawl and ratchet governed by the receiving means for affecting the distribution of the tokens; and means for releasing the tokens in said receptacles, said means controlled by projectiles engaging certain of said portions.

44. In an amusement device provided with projectile engaging portions the combination of token receiving means; distributing means for the tokens received including a plurality of receptacles; means loosely mounted on the distributing means and engageable by a member governed by the receiving means for affecting the distribution of the tokens; and means for releasing the tokens in said receptacles, said means controlled by projectiles engaging certain of said portions.

45. In an amusement device provided with projectile engaging portions the combination of token receiving means; distributing means for the tokens received including a plurality of receptacles; means comprising a cam provided with a pawl, said cam loosely mounted for operating a ratchet carried by the distributing means and said cam actuated by a member governed by the receiving means for affecting the distribution of the tokens; and means for releasing the tokens in said receptacles, said means controlled by projectiles engaging certain of said portions.

46. In an amusement device provided with projectile engaging portions the combination of token receiving means; distributing means for the tokens received including a plurality of receptacles; means comprising a cam provided with a pawl, said cam loosely mounted on the axis of said distributing means for operating a ratchet carried by the distributing means and said cam actuated by a member governed by the receiving means for affecting the distribution of the tokens; and means for releasing the tokens in said receptacles, said means controlled by projectiles engaging certain of said portions.

47. In an amusement device provided with token receiving means the combination of distributing means for the tokens received including a plurality of receptacles; and means for affecting the distribution of the tokens to said receptacles, said means including a pivoted member and a slide operatively mounted thereon, said slide governed by the receiving means.

48. In an amusement device provided with token receiving means the combination of distributing means for the tokens received including a plurality of receptacles; and means for affecting the distribution of the tokens to said receptacles, said means including a pivoted member and a slide operatively mounted thereon, said slide governed by the receiving means for actuation of the pivoted member.

49. In an amusement device provided with token receiving means the combination of distributing means for the tokens received including a plurality of receptacles; and means for affecting the distribution of the tokens to said receptacles, said means including an operating shaft, a member loosely pivoted on said shaft and engageable with the distributing means, a lever actuated by said shaft, and a member slidable on said lever and governed by the receiving means for actuation of the pivoted member.

In testimony whereof I affix my signature.

WALTER A. TRATSCH.